April 13, 1937.  H. N. HUSE  2,076,565
BALL WINDING MACHINE
Filed Jan. 15, 1936
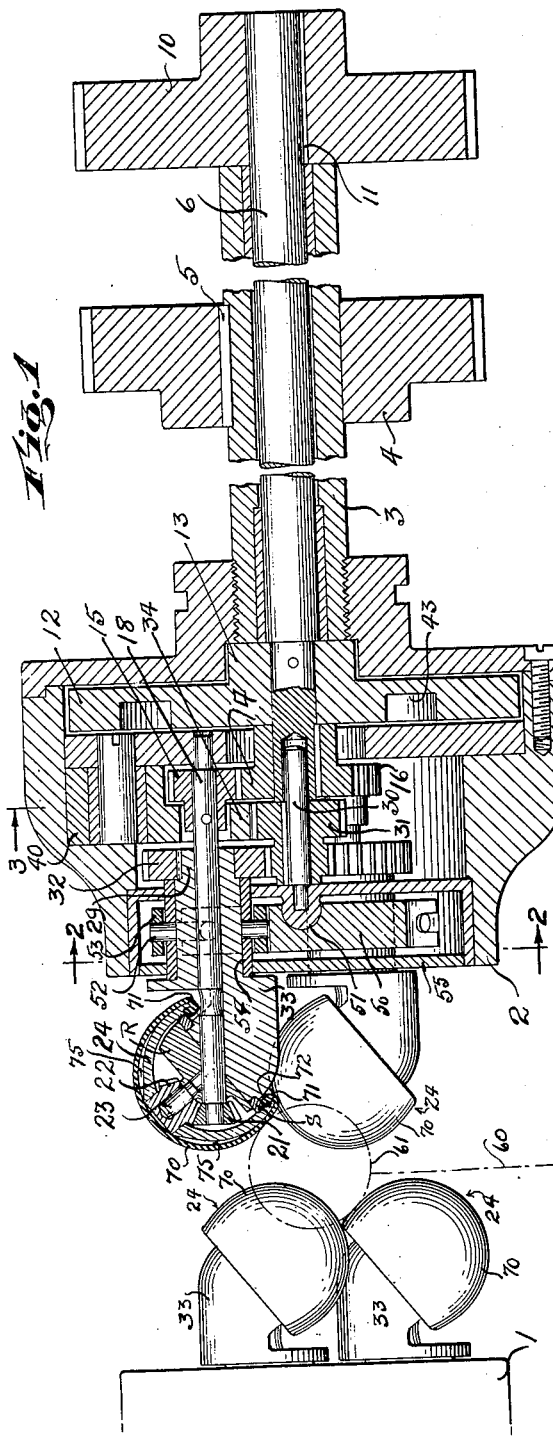
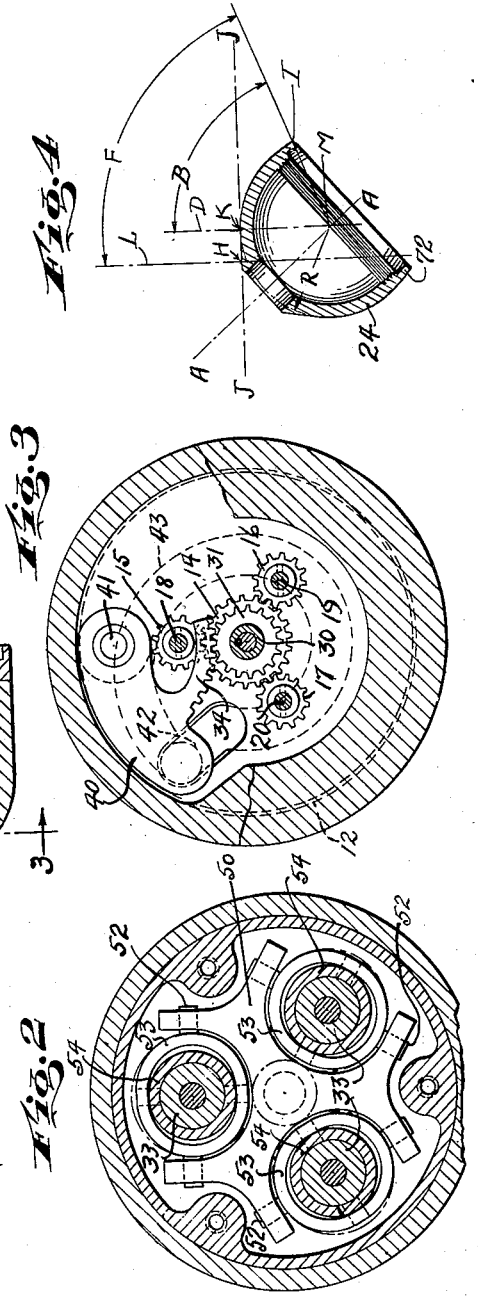
INVENTOR
HIRAM N. HUSE
BY
Kiddle, Bethell and Montgomery
ATTORNEYS Patented Apr. 13, 1937

2,076,565

UNITED STATES PATENT OFFICE 2,076,565

BALL WINDING MACHINE

Hiram N. Huse, Providence, R. I.

Application January 15, 1936, Serial No. 59,210

10 Claims. (Cl. 242—3)

This invention relates to machines for winding golf balls and has for one of its objects the provision of a construction wherein the ball as it is being wound is held between two driven rotatable heads each of which carries three spherical rollers, the rollers being driven about individual axes whereby in the winding operation a spherical ball is produced.

Another object of the invention is the provision of friction caps of rubber or the like on the spherical rollers, which serve to protect the surface of the ball being wound from the hard steel surface of the rollers. These caps may be so mounted on the rollers as to slip around on the surface of the rollers so that in the winding operation, should there be any slippage of the ball being wound, the caps will slip on the rollers and thereby prevent injury to the ball, this slippage of the caps also preventing grooving of the caps due to continuous contact between the ball and a predetermined line of movement along the roller surface.

Other objects of the present invention will be manifest from the following description and the accompanying drawing in which drawing:

Fig. 1 is a longitudinal sectional view of the rotatable heads;

Fig. 2 is a section on the line 2—2 of Fig. 1;

Fig. 3 is a section on the line 3—3 of Fig. 1; and

Fig. 4 is a sectional view of one of the rollers with explanatory diagram.

In the drawing of the present application I have illustrated the rotor mechanism which may be employed in ball winding machines as disclosed in my prior Patent No. 1,959,760 to which reference is made for details of the driving mechanism and other details not disclosed herein. The present invention, however, is directed to improvements in the rotor mechanism and to the coverings for the spherical rollers as will be pointed out hereinafter.

Referring to the drawing in detail, I and 2 designate opposed rotors which are of similar construction, hence a detail description of one will suffice. The rotor 2 which is the one to be described in detail is driven from a rotor drive shaft 3 mounted in suitable bearings (not shown) and secured to the housing of the rotor 2. The rotor drive shaft 3 may be driven from any suitable source of power through a gear 4 which is keyed thereto at 5.

A spindle drive shaft 6 is provided within the rotor drive shaft 3 for driving spindles within the housing 2 as will be described presently. This shaft 6 is driven from a suitable source of power (not shown) through gear 10 which is keyed thereto at 11.

The rotor mechanism within the housing 2 comprises a cam 12 having a hub 13 to which the shaft 6 is keyed.

Secured to the end of the shaft 6 within the rotor housing 2 is a gear 14 meshing with pinions 15, 16, and 17 keyed to spindles or spindle shafts 18, 19, and 20, respectively.

Each spindle shaft 18, 19, and 20 projects through the inner end of the rotor head 2 and is provided with a bevel gear 21, each of these gears in turn meshing with a bevel gear 22 on the shank 23 of spherical rollers 24. There are three of these spherical rollers for each rotor head, as will be understood. A bearing surface is provided for each of the rollers 24 by a metal ring S which is screwed and locked to the roller and which turns within a groove in the casting 33. R is a cap fastened to this casting to hold the ring in place.

The shaft 6 provides at its inner end a bearing for a stub shaft 30 which in turn carries a double gear 31, one part of this gear meshing with gear 32 keyed to the reduced portion 29 of a rotatable casting 33, for driving the same, the other part of this gear 31 meshing with a gear segment 34 carried by pivotal cam lever 40. The cam lever 40 is pivoted on cam lever shaft 41, this lever carrying cam roller 42 which follows the cam track 43 in cam 12. The motion given to the cam lever 40 by the shape of the path 43 in the cam 12 is transmitted to the gear 31 carried on the stub shaft 30 and by it to the gears 32 on the reduced portion 29 of the casting 33 to rock the same as will be explained presently.

It will be appreciated that I have provided means whereby the spherical rollers 24 are rotated about their individual axes through spindle drive shaft 6, gear 14, pinions 15, 16, and 17, spindles 18, 19, and 20, bevel gear 21 and bevel gear 22. As each of the spindles 18, 19, and 20, as above mentioned, is provided with the bevel gear 21, meshing with the gear 22 on the spindle of each spherical roller, the spherical rollers will be rotated always in the same direction about the axis of the spindle carrying each roller.

I also provide for individual rotation of the mount or casting 33 for each of the spherical rollers. The castings 33 are mounted in a spider 50 which is universally mounted on a ball and socket arrangement 51. This spider is provided with pintles 52 extending into eccentric rings 53 wherein the castings 33 are mounted. The castings 33 are rotated or rocked about their own axes by means of the cam 12, gear segment 34 and gear 31. As will be obvious, the motion of the cam 12 will impart through the cam roller 42 and cam lever 40 a rocking motion to the cam lever 40 in accordance with the shape of the cam track 43, this rocking motion being imparted to the mounts for the several spherical rollers as above described.

It will be noted from Fig. 2 that the arms of the spider 50 are bifurcated and form a three way toggle which will permit the three rollers 24 to adjust themselves automatically against any unevenness of the ball with equal pressure. The pressure of the rollers against the ball is exerted by means of a weight as shown in my prior patent above referred to. The castings 33 are mounted in roller sleeves 54 which slide through openings in the head plate 55 in parallel movements on their respective center lines. It will be appreciated from the foregoing that as the heads are moved together by the weight (not shown) the rollers are free to move relative to each other parallel due to the spider 50 being rocked on the ball and socket mount 51 to automatically adjust the rollers to compensate for any unevenness in the ball.

Now assuming that thread 60 under tension is led to the core 61 from a fixed source directly in line with the vertical plane through the center of the core of the ball, as shown in Fig. 1, and that the two rotors of the machine are rotating in the same direction. It will be apparent that if the spherical driving rollers 24 simply were carried around with the rotors, the ball core would merely be rotated about the horizontal axis of the machine and the thread wound around the core on the equatorial plane. It would be evident also that if the axes of the driving rollers 24 were parallel to the axes of rotation of the rotors the core would be given the same motion. However, the axes of the driving rollers 24 are at angles to the axes of rotation of the rotors of the two heads of the machine, so that if the rotors were stationary and the driving rollers on one head rotated in the opposite direction to the driving rollers on the other head the core would be turned or rotated about an axis at the same angle to the longitudinal axis of the machine as the setting of the shank 23 of the driving rollers.

However, rotation of the rotors of the machine in the same direction about a horizontal axis and rotation of the driving rollers 24 of one rotor about their individual axes in the opposite direction to rotation of the rollers 24 of the other rotor takes place simultaneously so that the core is given such movement that the thread is applied about or along various great circles of the core.

In order to protect the surface of the ball as the same is being wound against any twisting and abrasive movement against the steel rollers I employ rubber cushion caps 70 which are adapted to be slipped over the spherical rollers 24 the surfaces of which are polished. These caps are so constructed and mounted as to slip around on the surface of the steel rollers whereby the caps will turn with the ball and transfer any twisting or abrasive movement to the underside of the rubber against the steel rollers. These caps are cup shaped and have an inwardly projecting annulus 71 which is adapted to snap over the flange 72 of the roller whereby the same may be readily moved and replaced, this annulus, as will be seen from Fig. 1, filling the greater part of the cavity, provided for that purpose under the flange 72.

A further advantage of having these caps turn with the ball will be readily appreciated. If the caps were fixed to the rollers the continued contact between the ball and a predetermined line of movement along the roller surface would result in a groove being worn in the rubber caps. Consequently I mount the rubber caps so that the same will be allowed to creep or crawl around, thereby avoiding any grooving of the caps.

It will be noted that the bevel gears 21 and 22 are mounted wholly within the hollow spherical rollers 24, thereby providing for the maximum and additional roller surface at the open portion of the roller.

It should be noted that throughout all movements imparted to the ball the driving rollers 24 never leave the ball and are always driving in the direction of rotation of the ball and constitute a rolling motion relative to the surface of the ball.

In addition to the movements of the driving rollers above described, the mounts 33 for the several spherical rollers are given rocking motion in parallel relation about axes parallel to the axis of rotation of the rotor units or heads of the machine, through the cam 12, first in one direction and then in the opposite direction, this movement depending, of course, on the shape of the cam track 43 and such movement will obviously vary the angle of movement otherwise imparted to the ball by the rotation of the heads and individual rotation of the driving spherical rollers 24 about their individual axes.

Consequently as the thread 60 is constantly being drawn onto the core due to the winding rotation of the head units, a true sphere is provided by intermittently changing the driving axis of the core relative to the winding axis. It will be appreciated that such intermittent change of the driving axis is governed by the action of the spherical roller mounts controlled by the action of the cam acting simultaneously with the movement of the spherical rollers on their own axes.

Referring to the diagram of Fig. 4, the purpose of which is to illustrate how the rollers 24 will contact the ball being wound at any point on the surface between the points H and I: The line A—A represents the axis of rotation of the roller 24, B represents the desirable angle for the purpose of driving traction within which the ball may be in contact with the rollers 24 of prior structures such as my prior Patent No. 1,959,760.

Line D is one side of angle B and passes through the center M of the roller. The other side of angle B passes through point I and the center M of the roller.

Line J—J is at right angles to the line D and tangent to the radius R at K. The roller surface instead of being truly spherical is extended along the line J—J so that the desirable angle above mentioned within which the rollers may be in contact with the ball being wound is increased by extending the roller surface as just described along the line J—J from the point K to slightly beyond the contact limit H. It will be seen if lines D and L are parallel that the angle F, which includes the total contact surface, remains the same as angle B, and that the ball being wound will remain in contact with the surface of the rollers not only between the points K and I but between H and I, obviously a greater desirable contact surface than possible with prior structures.

It will be noted that a space 15 is provided adjacent this increased contact surface between the cap and the rollers whereby a cushioning effect is produced—when the ball being wound contacts the rollers at this point.

To compensate for the gradually increasing diameter of the ball, the head 2 and associated mechanism are allowed to slide away from the other head, this movement being controlled by a weight as disclosed in my prior patent above referred to.

It will be seen from the foregoing that I have provided a machine for winding balls in which a true sphere will be produced, it being understood, of course, that one or a plurality of threads may be wound on at the same time. It will be appreciated also that inasmuch as the hemispherical rollers 24 are always being rotated there can be no chafing or scrubbing of the thread on the surface of the ball, which has always been a source of trouble heretofore and that the ball is further protected by means of the rubber cushion caps.

It is to be understood that changes may be made in the details of the construction above described within the purview of my invention.

What I claim is:—

1. In a ball winding machine the combination of opposed rotary winding heads and rotary gripping means carried by said heads comprising rollers having rubber caps adapted to rotate thereon.

2. In a ball winding machine the combination of opposed rotary winding heads and rotary gripping means carried by said heads comprising rollers having rubber caps adapted to rotate thereon, said caps each having an annular bead for removably securing the same on said rollers.

3. In a ball winding machine the combination of opposed rotary winding heads and rotary gripping means carried by said heads comprising rollers, the major portion of which are spherical with extended surfaces tangent to the spherical portion.

4. In a ball winding machine the combination of opposed rotary winding heads and rotary gripping means carried by said heads comprising rollers, the major portion of which are spherical with extended surfaces tangent to the spherical portion, and caps carried by said rollers.

5. In a ball winding machine the combination of opposed rotary winding heads and rotary gripping means carried by said heads comprising rollers, the major portion of which are spherical with extended surfaces tangent to the spherical portion, said rollers each being provided with an annular flange, spherical caps on said rollers, each having an annular bead engaging said flange whereby to removably secure the same thereon and to permit of rotation of the caps relative to said rollers.

6. In a ball winding machine the combination of opposed rotary winding heads and rotary gripping means carried by said heads comprising rollers the major portion of which are spherical with extended surfaces tangent to the spherical portion, said rollers each being provided with an annular flange, spherical caps on said rollers each having an annular bead engaging said flange whereby to removably secure the same thereon and to permit of rotation of the caps relative to said rollers said extended surface providing a space between the caps and the rollers to provide a cushion for the balls being wound.

7. In a ball winding machine, the combination of opposed rotary winding heads, ball-gripping rollers carried by said heads, spindles for said rollers, a yielding mount for said spindles, means for rotating said rollers on their individual axes with the rollers in constant rolling driving contact with the surface of a ball being wound, mounts for said rollers, means for rotating said mounts on axes parallel to the axis of rotation of said heads, and means for reversing the direction of rotation of said mounts.

8. In a ball winding machine, the combination of opposed winding heads, means for rotating said heads, sets of hollow ball-gripping rollers carried by each of said heads, a spindle for mounting each of said ball-gripping members, said spindles extending into said hollow rollers, bevel gears on said spindles within said head, an annular flange on each of said heads, a rubber cap for each roller having an annular flange adapted to be received by the flange on said rollers, whereby the same can be readily replaced, rotatable mounts for each of said spindles and ball-gripping rollers, and means for effecting simultaneous rotation of said mounts to vary the setting of the ball-gripping rollers with respect to the winding heads.

9. In a ball winding machine, the combination of opposed rotary winding heads, hemispherical ball gripping rollers carried by each of said heads, each of said rollers having an annular flange, a removable friction cap for each of said rollers adapted to be held thereon by said flanges, the axes of rotation of said rollers being at an angle to the axis of rotation of said heads, means for changing the relation of the axes of rotation of the said rollers with respect to the axes of rotation of said heads, said rollers at all times rolling in driving contact with the ball surface with said caps interposed and cooperating with the winding heads to present a continuously changing ball surface to the point of winding and said caps moving on said rollers to present a different line of contact as the ball is being wound.

10. In a ball winding machine, the combination of opposed rotary winding heads, ball gripping and driving means carried by said heads and cooperating therewith to present different parts of the ball surface to the point of winding, a positive drive for said ball gripping means, each of said ball gripping and driving means being provided with an annular flange, a friction cap on each of said ball gripping means provided with a bead for engaging the flange of the ball gripping means thereby removably to secure the friction cap in place, and means for maintaining said friction caps at all times in driving contact with the surface of the ball being wound.

HIRAM N. HUSE.